Sept. 26, 1972   H. W. CAMPBELL   3,694,243
COATING OF PARTICLES AND PROCESS FOR MANUFACTURING
SAID COATING
Filed Dec. 22, 1969

INVENTOR
HUGH W. CAMPBELL

# United States Patent Office 3,694,243
Patented Sept. 26, 1972

3,694,243
COATING OF PARTICLES AND PROCESS FOR MANUFACTURING SAID COATING
Hugh W. Campbell, Xenia, Ohio, assignor to The National Cash Register Company, Dayton, Ohio
Filed Dec. 22, 1969, Ser. No. 886,940
Int. Cl. B44d 1/02
U.S. Cl. 117—27    8 Claims

ABSTRACT OF THE DISCLOSURE

A process is disclosed for coating small particles onto a substrate surface wherein the particles initially have a covering of heat softenable material. The particles are coated onto the substrate by being contacted with the substrate while it is at a temperature above that required to cause the heat softenable material to become flowable. The covering on the particles then flows to points of contact between the particles and the substrate and between individual particles themselves. The substrate is cooled to a temperature at which the once-softened material is solid and, perhaps also cross-linked, thereby providing an adhesive binding between the particles and objects touching the particles. The thus-manufactured particle-coated substrate is also considered to be a part of the present invention. In a preferred embodiment of the present invention, the particles are minute, substantially spherical, capsules having capsule walls of a polymeric film-forming material, and containing a capsule internal phase. In that preferred embodiment, the heat softenable material which covers the minute capsules is present, as a covering, in the form of very finely-divided dust clingingly adherent to the capsule walls and is thermosetting after being, initially, heat-softened.

BACKGROUND OF THE INVENTION

Field of the invention

The present invention relates to a process for coating particles, covered with a heat-softenable material, onto a substrate wherein the covering of material comprises a very small percentage, by weight, of the particle-coating system. It further relates to such a process wherein the particles are minute, substantially spherical, capsules having walls of polymeric material and containing a capsule internal phase. The process of the present invention comprises contacting the particles, covered with a heat-softenable material, with a heated substrate coated such that the heat of the substrate causes the covering to become flowable and provides contact between the particles and the substrate, whereupon the substrate is cooled to solidify the softenable material and provide an adhesive bond between particles and the substrate and between particles and adjacent particles.

The present invention, additionally, pertains to a process for coating a substrate with a regular array of particles such that the coated particles form a display of data or serves some decorative purpose or end. The thus-arrayed product of the present process is also included within the ambit of the present invention wherein the array might be included in a road sign, an advertising marquee or display, or even in sidewalk or highway reflective coatings.

The process of the present invention also pertains to the manufacture of other related products of the process, such as, abrasive sheets or abrasive papers wherein the abrading particles are adhered to a substrate sheet utilizing the process of the present invention with an, initially heat-softenable, later curing, adhesive.

The invention, in one of its preferred embodiments, includes coating particles, according to the process of the present invention, onto a substrate of material which is to be utilized as a sealing gasket. In that embodiment, the particles comprise capsules which contain a liquid sealing compound;—the capsules being pressure-rupturable to release the liquid sealing compound at the time of use of the gasket material.

It can be seen, and should be understood from the above description of widely varying applications of the present process and products manufactured therefrom, that the process is broadly applicable to the manufacture of a multitude of novel devices.

Description of the prior art

United States patent application Ser. No. 530,392 filed Feb. 28, 1966, now abandoned, on the application of John G. Whitaker, discloses and claims minute, substantially spherical, capsules having adherent on the external capsule wall surface, microscopic particles of a solid curing agent effective in curing polymerizable liquid polymeric material contained within the capsules. Although the capsules of that patent application are similar, in physical form, to the particles and capsules of the present invention, there is no teaching, in the above-identified patent application, of capsules covered with finely-divided dust or a thin layer of heat-softenable material for eventual use, itself, as an adhesive. The physical form of the covered particles utilized in the present invention does not, of itself, form a portion of what is here considered to be patentable. The process for utilizing the covered particles and the structure or array of particles resulting from their use, is what is considered to constitute the present, patentable and claimed invention.

U.S. Pat. No. 2,796,359 issued June 18, 1957 on application of William C. Speed discloses that magnetic sound recording tape can be produced by flowing a melted coating mixture of finely divided magnetic particles and thermoplastic material onto a substrate film. Also disclosed in that patent is a process whereby the magnetic coating material mixture is formed of a dispersion of finely divided magnetic particles in a liquid solvent vehicle which might include thermoplastic materials. Embodiments of the above-identified patent do not include thermoplastic-covered particles applied to a heated substrate such as is disclosed and claimed in the present patent application. In any case, magnetic particles of the above-identified patent are disclosed therein to be completely encased within a binder of the thermoplastic polymeric material. Particles of the present invention are only adhered together onto the substrate at points of contact therebetween and are not entirely encased within a binder of thermoplastic material.

U.S. Pat. No. 2,890,969 issued June 16, 1959 on application of Frederick V. Schossberger et al. discloses particles adhered to a paper substrate base by means of a binder adhesive system. In that patent, however, the binder adhesive system is disclosed to be initially, separately, applied to the substrate base whereupon capsules are later applied and are held only by an adhesive bond between the particles and the substrate and not by a bond between adjacent particles themselves. In the above-identified patent to Schossberger et al., the adhesive material is separately applied and is in the form of a liquid, rather than being provided as an integral element of the particles to be adhered to a substrate, and rather than being applied simultaneously with the particles to the substrate as is practiced in the present invention.

SUMMARY OF THE INVENTION

In the past, articles which include a substrate having particles of material coated thereon, have been found deficient in several qualities. In some cases, coating of the particles onto the substrate is either too expensive for the application desired or is inefficient where a coating process is used which is economical enough to afford a product within a desired or required cost range. In some coating methods in articles of the past, minute particles were coated onto a substrate and were deeply embedded in a binder material. Such deep embedment while affording protection to the particles against abrading forces, also overprotects the particles and causes them to be relatively unavailable for many uses.

In prior art uses where particles to be coated on the substrate were present as capsules which contain a capsule internal phase, the capsules were adhered to a substrate by use of a first-applied adhesive coating and then were protected from abrading forces which tend to shed capsules from the substrate by a polymeric, drapery, overcoating. Such is an effective means of providing, for particles coated onto a substrate, protection against being shed from the substrate and, further, protection against lateral movement relative to the other particles. On the other hand, however, such an application, comprising at least three separate and distinct steps, has been found to be expensive. A process similar to the above is described in U.S. Pat. No. 3,485,132 issued Dec. 23, 1969 on application of John F. Hanny et al.

In particle-coating processes of the past, particles and the binder material were often mixed together to form a liquid or pasty mass, and the mass was then coated onto the substrate to provide a dispersion of particles within a matrix of polymeric binder material. The use of such liquid coating systems which comprised particles to be applied, was messy and wet and often extremely inconvenient or impossible to used.

It is often desired or required to provide neat arrays of regular particles, perhaps substantially spherical particles, wherein a monolayer, or a few layers, of particles are laid in a regular arrangement on a substrate adapted to receive the array. Processes for providing such regular arrays used prior to the time of the present invention were often difficult to practice or expensive to achieve or both. In instances prior to the present invention where a permanently tacky or long-tacky adhesive material was utilized between the substrate and particles, a regular, spaced-apart, arrangement of particles was found to be extremely difficult to achieve.

The above-described difficulties and other difficulties have long been present in processes and products of processes which are utilized in coating minute and individual particles onto substrates, either regular or irregular. The present invention is intended to cure the above-mentioned difficulties and other problems which might exist in particle coating processes presently used. Accordingly, it is an object of the present invention to provide a particle coating process which is not messy or sticky and which permits application of a single, dry, particulate material onto the substrate to be coated.

It is another object of the present invention to provide and inexpensive and efficient process for adhering a coating of minute particles to a substrate without deeply embedding the particles within a binder material simultaneously applied to the substrate. It is the further object of the present invention to provide such a coating of minute particles on a substrate wherein said particles are only partially embedded and yet wherein the individual particles are anchored by sidewise particle-to-particle contact thus obviating necessity for a protective, drapery, overcoating.

It is an additional object of the present invention to provide an array of adhered-together particles, either in substantially monolayer or in multilayer disposition, wherein the particles of the array do not rely on a substrate for support and wherein the array is self-supporting.

It is further the object of the present invention to provide such a particle-coating process wherein the particles comprise substantially spherical, minute, capsules and wherein the capsules contain a material which, on use, is to be made available at the surface of the particle-coated substrate. It is a further object of the present invention to provide a process to manufacture regular arrays of substantially spherical particles, either in monolayers or in multilayers, inexpensively and efficiently. Those skilled in the arts, after being provided with the disclosure of the present invention, will comprehend other objects of the invention made apparent by this specification.

The present invention is a process for coating particles onto a substrate wherein the particles are covered by a heat-softenable, eventually adhesive material. The process comprises the steps of (a) contacting the covered particles with the substrate to be coated; (b) heating the substrate to a temperature at which the heat-softenable material is flowable to cause flow from the particles to wet the substrate; and (c) cooling the substrate to a temperature at which the heat-softenable material is solid to cause the material to solidify and provide an adhesive bond between particles and the substrate and between particles and other particles.

As used in this patent application, expressly for the purpose of avoiding confusion in terminology, the word "covering" refers to the heat-softenable or metalable adhesive material used to bind particles to a substrate and to each other. The word "coating" refers to the particles as they are situated on a substrate in the form of an array.

The substrate utilized in practicing the present invention can be of any material. The substrate can be sheets, that is, thing, substantially 2-dimensional bodies such as sheets of paper or rolls of cloth or plastic; the substrate can be slabs or chunks, that is, substantially 3-dimensional bodies such as blocks or boxes or balls; the substrate can be a substantially one-sided surface, such as floors, pavement or walls. The substrate can have a regular or even surface; or the surface of the substrate can be irregular and bumpy. The only requirement for a substrate, in applying the process of the present invention, is that the substrate be capable of accepting a temperature rise above the melting or flowing temperature of the meltable material utilized in adhering the particles. Moreover, the substrate must be capable of holding that temperature rise for at least a short time, that is, a time sufficient for contacting covered particles with the substrate to provide an adhesive bond.

In order to conduct the process of the present invention, all that is required, over and above the substrate to be coated, is the particles, covered with some appropriate meltable material. Particles to be used can be irregular or regular, large or small, solid or hollow, spherical or not, of organic material or inorganic material, crystalline or amorphous. In short, any minute particles can be utilized in the process of the present invention provided only that a meltable adhesive material is available which will wet the particles and adhere to the substrate material. In a preferred embodiment of the present invention, the particles take the form of minute capsules wherein there is a capsule wall of polymeric material and a capsule internal phase of solid or liquid material different from the material of the capsule wall. Of course, in the utilization of capsules as particles to be coated, the capsule internal phase plays no part in the process because only the capsule wall material makes contact with the covering of meltable adhesive. Although the size of the particles may vary considerably according to the conformation of the substrate to be coated, particles found to be most preferred in practice of the present invention, up to this time, have had an average particle size in the range of 400 to 2000 microns in average diameter. Particles having an average diameter of about 200 to about 4000 microns, are believed to be preferred; but particles having an average diameter of about 100 to 10,000 microns can be successfully utilized in practicing the present invention. In the case where the particles to be coated are capsules, the capsules can be provided in the above-mentioned sizes and, additionally, the capsules usually contain from about 50 to about 98 percent, by weight, capsules internal phase material.

The particles or capsules can have, of themselves, an exterior surface aspect of meltable material. In the case of a non-capsule, the particle itself can comprise a meltable material; and in the case of capsules, the capsule wall material can comprise meltable material. Such particles and capsules can be utilized in the process of the present invention without an addition of meltable adhesive material.

A preferred method for covering the particles with adhesive material is by utilizing a dust of the meltable material and effecting a clinging covering of the dust on each individual particle by simply contacting the particles with the finely divided dust. A similar construction of dust-covered particles has been described in the previously identified United States patent application, Ser. No. 530,-392, on the application of Whitaker et al., wherein capsules, containing a curable liquid sealing material, have a dust covering comprising a curing agent for the contained sealant. Although it is believed that the dust of meltable material clings more effectively to particles the surfaces of which are insulators, that is, the surfaces of which have dielectric characteristics, such surfaces are not absolutely necessary for successful practice of the present invention. A meltable material dust is preferred wherein the dust particles have ultimate sizes of from about 0.5 to about 3 microns in average diameter, However, the range of eligible dust particle sizes is believed to extend from about 0.1 to about 50 microns or perhaps slightly larger.

Other methods can be utilized for covering the particles to be coated with meltable adhesive material. One such other method is simply to immerse the particles in, or spray the particles with, a solvent solution of the desired adhesive material in order to provide a thin, continuous layer of adhesive to each individual particle to be coated. An important feature of the adhesive coating procedure is that a very small amount of adhesive material need be used. It is important to practice of the present invention, in providing maximum availability of particle surfaces and maximum surface area of particle arrays, to use an amount of adhesive material which will provide adhesive bonding only at contact points between particles and the substrate surface and between particles and othr particles; and, further, that excess adhesive material not be available to hide or obscure particles adhered to the substrate.

Adhesive materials utilized in practicing the present invention can be any of the well-known and commonly used materials. The adhesive materials can be thermoplastic or thermosetting; the criterion being that the adhesive material must be meltable or softenable, at least one time, to such a degree that it can flow when heated to effect adhesive contact between particles and contiguous surfaces. Both thermoplastic and thermosetting materials are identified herein as "meltable" and "adhesive" and "heat-softenable" with the understanding that they meet the above-stated criterion for eligibility. Examples of thermosetting materials are: alkyd resins; allyl resins, such as diallyl phthalate and diallyl isophthalate; amino resins, such as melamines and urea-containing resins; epoxy resins; phenolic resins; polyesters; or even polyimide resins; and the like. Examples of thermoplastic materials are: High and low density polyethylene; polyvinyl chloride; polystyrene, polypropylene; acrylonitrile-butadiene-styrene; acrylics; cellulosics; acetals; polyamides (nylons); polycarbonates polyphenylene oxides; fluoroplastics; and the like. In selecting a particular adhesive material for use in the present process, wetting characteristics of the meltable adhesive for the substrate and for the particles to be coated must be considered; and, also, the melting point or "flow" point must be considered. For purposes of the present disclosure, the phrase "melting point" will be utilized to mean a temperature at which the adhesive material becomes flowable enough to provide an adhesive bond between particles and adjacent bodies with which they come into contact. Preferred melting points reside in the temperature range of approximately 50 to 200 degrees centigrade; but materials with any melting point temperatures can be selected with only the requirement that the substrate and particles survive any temperature extremes required in practice of the coating process.

Heat can be added to the substrate by any means convenient or available; care being required only to guard against damaging the substrate or the particles by excessive temperature. Some care must also be taken to avoid raising the temperature of the substrate to a point that the adhesive material is decomposed or is rendered too flowable. Cooling of the substrate having the particles coated thereon can also be achieved in any convenient manner such as by immersion in some ambient cooling fluid or simply by permitting the heated and particle-coated substrate to exist in an atmosphere having a temperature below the melting point of the meltable adhesive material. In some cases, a cooling rate may be required such that a coated array of particles will be relatively quickly frozen with respect to their particle-to-particle relation.

A close-packed particle array manufactured by the present process comprises both particle-to-particle adhesive bonds, and particle-to-substrate adhesive bonds leaving a large area of particle surface exposed. If desired or required for some particular use or application, even more particle surface area can be exposed, in the manufacture of an array, by utilizing a flexible or strippable material as a substrate to which the meltable adhesive material only imperfectly adheres. In some applications where exposed particle surface area is valuable, such as in the case of catalyst particles which are to be supplied in the form of a rigid array or a block array of particles bonded to each other, a flexible substrate in the form of a peelable film can be utilized on which to coat the adhesive-covered particles. After the steps of coating, heating, and cooling the substrate film can be peeled away leaving a rigid body adhesively joined only at points of particle-to-particle contact with a minimum amount of adhesive material.

Figure 1:
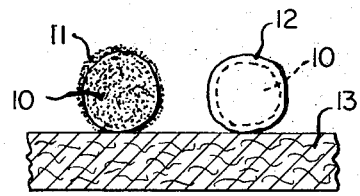
FIG. 1 is a figurative representation of meltable adhesive-covered particles for use in practice of the present invention.
Figure 2:
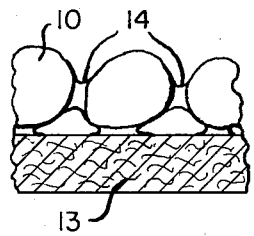
FIG. 2 is a figurative representation of the particle of FIG. 1 after having been subjected to the process of the present invention and after having been bonded to a substrate.
Figure 3:
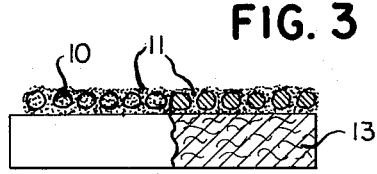
FIG. 3 is a figurative representation, in partial cross-section, of a multitude of meltable adhesive-covered particles situated in a monolayer coated onto a substrate prior to the heating and cooling steps of the present process.
Figure 4:
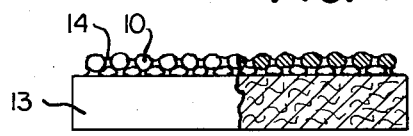
FIG. 4 is a figurative representation, in partial cross-section, of the multitude of particles of FIG. 3 after the present process has been completed.
Figure 5:
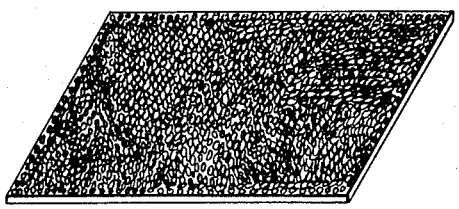
FIG. 5 is a representatiton of an array of particles coated onto a substrate wherein the substrate, in this drawing, is intended to be shown as a flexible substrate such as, for example, an abrading sheet with abrading particles adhered to a carrier by the process of the present invention.
Figure 6:
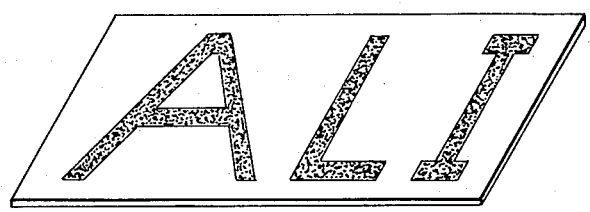
FIG. 6 is a representation of a display array wherein, for example, substantially spherical particles such as reflective spherules are bonded according to the process of the present invention in a decorative or in a data-yielding arrangement on a wall, pavement surface, or a display sign.
Figure 7:
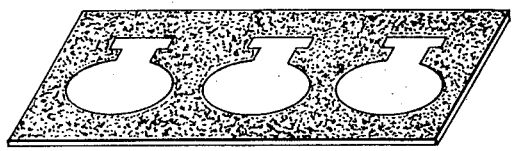
FIG. 7 is intended to represent a gasket or similar intervening sheet device useful in insuring a seal of mating workpiece surfaces. The gasket or sealing device of FIG. 7 is provided with particles according to process of the present invention wherein, in this case, the particles might be capsules which contain a liquid or flowable sealant material released by application of pressure in the customary use of the gasket material.

And now, as to the more specific description of elements depicted in the various figures:

Individual particles 10 are depicted in FIG. 1 and, also in FIG. 1, there are depicted two of the forms of adhesive material for covering the particles. Meltable adhesive dust 11 is shown covering the particle on the left of FIG. 1. A thin-layer, continuous, coating of meltable adhesive material 12 is shown covering the particle 10 on the right in FIG. 1. Both of the above-described particles are resting on but not adhered to substrate 13 in FIG. 1. FIG. 2 depicts particles 10 adhered to substrate 13 and to other particles 10 by melted and resolidified adhesive material 14. The melted and resolidified material 14 is a result of practicing the process of the present invention on either the meltable adhesive dust 11 or the thin, meltable adhesive layer 12. In FIG. 3 and FIG. 4 individual elements are again identified by number but their relationship is considered to be made apparent from the above descriptions of FIG. 1 and FIG. 2 and will not be repeated. It should be noted that in all of the figures, the various elements are not drawn to scale. The relative sizes, for example, of dust particles 11, thermoplastic layer 12, and particles 10 are not depicted in any accurate way because the sizes of the elements can vary considerably as to relative dimensions, one to the other. Also, the particles of FIGS. 1–4 are depicted to be in exaggeratedly spaced relation, both as to the substrate and as to other particles;—such spaced-apart relationship being necessary to reveal detail of wetting characteristics between individual particles and contiguous surfaces. FIGS. 5, 6 and 7 are intended to be gross depictions of products of the present invention and the individually bonded particles are so minute in relation to the size of the total array in each drawing, that identification of individual elements is considered to be unnecessary.

DESCRIPTION OF PREFERRED EMBODIMENTS

Example I.—In this example, a preferred embodiment of the invention is described wherein the particles to be coated are capsules which contain a liquid capsule internal phase (for example, capsules which contain a liquid curable polymeric sealant material ). Capsules which can be utilized in the practice of this example include, for example, capsules having walls of hydrophilic material such as a combination of gelatin and gum arabic as manufactured by well-known encapsulation processes such as that described in U.S. Pat. No. 2,800,-457 utilizing coacervation. The size range of capsules utilized in this example is approximately 500 to 850 microns in average diameter. This size range is utilized because it has been found that such a size range yields a substantially monolayer array of capsules. Small capsules tend to form multilayers and their use often results in an uneven, exterior aspect of the coated array; an effect which is sometimes to be avoided.

The heat-softenable adhesive material utilized in the present example is a solid, epoxide-containing a polymeric material, sold by Minnesota Mining and Manufacturing Company, St. Paul, Minn., United States of America, under the trademark designation "Scotchcast Brand Resin No. 265." The adhesive material is ground into the form of a dust having an ultimate average particle size of from about 0.5 to about 3 microns. The material has an approximate melting point of 175 degrees centigrade. About 95 grams of the capsules are shaken in a vessel of appropriate size with about 5 grams of the adhesive dust until an even covering of the dust can be observed clinging to all of the capsules. The unclinging dust is separated from the now-dust-covered capsules by pouring the mixture of capsules and dust onto a screen sieve having openings of less than about 500 microns. The dust-covered capsules are thus retained on the screen and the loose, unclinging dust escapes through the sieve to be reused later. The covered capsules can now be coated onto any of various substrates by simply heating the surface of a substrate to a temperature above the melting point of the meltable adhesive material. At the temperature where the adhesive material is flowable, the small amount of adhesive which is clinging to the capsule surfaces will be drawn, apparently by surface tension forces, to points of contact between particles and the substrate and between particles and adjacent particles. Upon removal of heat and subsequent cooling of the particle substrate system, the adhesive material solidifies (and in this example cures) and a susbtantially monolayer, close-packed array of substantially spherical particles are adhered to whatever substrate was chosen.

Example II.—Silica particles having a size of from about 200 to about 400 microns are shaken together with a finely-divided dust of thermosetting, meltable, adhesive material such as a solid, epoxide-containing, polymeric material, sold by Minnesota Mining and Manufacturing Company, St. Paul, Minn., United States of America, under the trademark designation "XR–5133." The dust-covered particles are separated from free adhesive dust by sieving and the dust-covered particles are spread onto high-strength paper sheets in preparation for a heating cycle. The particle-coated sheets are introduced into an oven heated to about 175 degrees centigrade and the sheets are maintained at that temperature for about 10 minutes, after which time the silica particles are solidly adhered to each other and to the heavy paper substrate.

Example III.—Capsules in the size range of about 500-to-750 microns in average diameter are covered with a thermoplastic adhesive material and are placed on a sheet substrate material in a multilayer depth. The substrate is heated from below, in some desired configuration, to a temperature above the adhesive melting point. The heat is then removed, the substrate is permitted to cool and unadhered particles are shaken from the substrate which is seen to support a multitude of the capsules in conformance to the heating pattern before-applied. In this example, the capsules can contain liquid dye solutions, aromatic compounds, reactive components of a chemical system, adhesive materials, and the like, all designated to become activated only at the time of capsule rupture and then only at the particular locations of the previously-applied pattern of heat.

What is claimed is:

1. A process for coating individual, substantially spherical, particles covered by a clingingly adherent, finely divided, dust of a meltable adhesive material having an average size of about 0.1 to about 3 microns onto a substrate comprising the steps of:
    (a) contacting the meltable adhesive-covered individual particles with the substrate;
    (b) heating the substrate to a temperature at which the adhesive is flowable to cause the adhesive material to flow from the particles to wet the substrate but at which the particles are not melted; and
    (c) cooling the substrate to a temperature at which the adhesive material is solid to cause the adhesive material to solidify and provide an adhesive bond between individual particles and the substrate and between individual particles and other particles.

2. The process of claim 1 wherein the particles are 100 microns to 10,000 microns in average diameter.

3. The process of claim 2 wherein the particles are capsules comprising 2 to 50 percent, by weight, solid polymeric capsule wall material and 98 to 50 percent, by weight, capsule internal phase material.

4. A process for applying individual, substantially spherical, particles onto a substrate comprising the steps of:
    (a) contacting the individual particles to be applied with a clingingly adherent finely-divided dust of meltable adhesive material having an average size of about 0.1 to about 3 microns to lay a covering of the dust of the adhesive material onto the exterior aspect of the particles;
(b) heating the substrate to a temperature above the adhesive material melting point but below the melting point of the particles;
(c) contacting the covered particles with the heated substrate to melt the adhesive material; and
(d) cooling the substrate to solidify the adhesive material and thereby adhere the individual particles to the substrate and to each other.

5. The process of claim 4 wherein the particles are 100 microns to 10,000 microns in average diameter.

6. The process of claim 5 wherein the particles are capsules comprising 2 to 50 percent, by weight, solid, polymeric capsule wall material and 98 to 50 percent, by weight, capsule internal phase material.

7. The process of claim 4 wherein the dust of meltable adhesive material has an average size of about 0.1 micron to about 50 microns.

8. A process for preparing an array of individually adhered-together, substantially spherical particles comprising the steps of:
(a) contacting particles covered by a layer of clingingly adherent, finely-divided, dust of meltable adhesive material having an average size of about 0.1 to about 3 microns with the substrate;
(b) heating the substrate to a temperature at which the adhesive material is flowable but at which the particles are not melted to cause the adhesive material to flow between the particles of particle-to-particle points of contact;
(c) cooling the substrate to a temperature at which the adhesive is solid to cause the adhesive to solidify and provide an adhesive bond between particles and particles; and
(d) stripping off the substrate of the particle-to-particle array of held together particles.

References Cited

UNITED STATES PATENTS

| | | | |
|---|---|---|---|
| 3,462,293 | 8/1969 | Varis | 117—100 C |
| 2,603,575 | 7/1952 | Schramm | 117—19 |
| 2,761,177 | 9/1956 | Walters | 117—16 |
| 2,793,136 | 5/1957 | Root | 117—16 |
| 2,901,337 | 8/1959 | Keutgen et al. | 117—33 |
| 2,974,059 | 3/1961 | Gemmer | 117—21 |
| 2,988,460 | 6/1961 | Eichel | 117—3.4 |
| 3,090,755 | 5/1963 | Erchak et al. | 117—100 R |
| 3,272,897 | 9/1966 | Herman et al. | 117—100 I |
| 3,386,824 | 6/1968 | Miller | 117—33 |
| 3,418,656 | 12/1968 | Vassiliades | 117—100 A |
| 3,429,827 | 2/1969 | Ruus | 117—100 A |
| 3,443,492 | 5/1969 | Pleass | 117—100 S |
| 3,503,778 | 3/1970 | Corbett et al. | 117—19 |
| 3,506,469 | 4/1970 | Titow | 117—21 |

WILLIAM D. MARTIN, Primary Examiner

W. R. TRENOR, Assistant Examiner

U.S. Cl. X.R.

117—16, 21, 31, 33, 100 A, B, C, D, M, S; 264—125